(12) United States Patent
Sakai et al.

(10) Patent No.: US 6,557,823 B2
(45) Date of Patent: May 6, 2003

(54) ELECTROMAGNETIC VALVE

(75) Inventors: Toshiyuki Sakai, Kariya (JP); Tomohiko Funahashi, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 52 days.

(21) Appl. No.: 09/983,083

(22) Filed: Oct. 23, 2001

(65) Prior Publication Data

US 2002/0050580 A1 May 2, 2002

(30) Foreign Application Priority Data

Oct. 26, 2000 (JP) ........................................ 2000-327553

(51) Int. Cl.[7] .............................................. F16K 31/06
(52) U.S. Cl. ............................ 251/129.15; 251/129.01
(58) Field of Search ........................ 251/129.01–129.22

(56) References Cited

U.S. PATENT DOCUMENTS

| 4,250,922 | A | * | 2/1981 | Will et al. | |
| 4,540,154 | A | * | 9/1985 | Kolchinsky et al. | ... 251/129.15 |
| 4,662,605 | A | * | 5/1987 | Garcia | .................... 251/129.15 |
| 4,681,143 | A | * | 7/1987 | Sato et al. | ............. 251/129.21 |
| 4,725,039 | A | * | 2/1988 | Kolchinsky | ............ 251/129.15 |
| 4,744,389 | A | * | 5/1988 | Ichihashi | ............... 251/129.15 |
| 5,875,922 | A | * | 3/1999 | Chastine et al. | ....... 251/129.15 |

FOREIGN PATENT DOCUMENTS

JP        10-122412        10/1996

* cited by examiner

Primary Examiner—Paul J. Hirsch

(57) ABSTRACT

The gist of the present invention is to provide an electromagnetic valve 1 which can be produced at a lower cost. In this electromagnetic valve 1, a piston 3 and a plunger 7 are integrated with each other in such manner that an outer surface of the plunger 7 and an outer surface of the piston 3 are made coplanar in substance in the axial direction.

3 Claims, 4 Drawing Sheets

ELECTROMAGNETIC VALVE

CROSS REFERENCE TO RELATED APPLICATIONS

The present application is based on and claims priority under 35 U.S.C. §119 with respect to Japanese Patent Application No. 2000-327553 filed on Oct. 26, 2000, the entire content of which is incorporated herein by reference.

FIELD OF THE INVENTION

The present invention is generally directed to an electromagnetic valve.

BACKGROUND OF THE INVENTION

One of the conventional electromagnetic valves is disclosed in, for example, Japanese Patent-Laid Open Publication No. Hei. 10 (1998)-122412. This conventional electromagnetic valve is composed of a coil-mounted yoke, a sleeve fixed to the yoke and having plural ports, a plunger arranged so as to be slidable relative to the yoke, and a piston slidably fitted in the sleeve for opening and closing the respective ports. When the coils are energized, the resultant magnetic flux applied to the plunger causes the plunger to slide relative to the yoke, which results in sliding movement of the piston relative to the sleeve, thereby opening and closing the respective ports of the sleeve.

In this conventional or prior art electromagnetic valve, the plunger and the piston are slidably supported by the yoke and the sleeve, respectively, in independent mode. The plunger and the piston are arranged in face-to-face manner and the piston is urged by a spring toward the plunger in order to engage an end of the piston with an end of the plunger.

However, in the above structure, due to the fact that the plunger and the piston are slidably supported by the yoke and the sleeve, respectively, in independent mode, to establish the engagement between the ends of the respective plunger and piston, the plunger and the piston have to be supported by the respective yoke and sleeve in greater precision so that the relative position between the plunger and the piston is made adequate. In addition, for slidable supports of the plunger and the piston on the respective yoke and sleeve, journaling bosses have to be provided on the respective yoke and sleeve. This also results in higher production cost of the device and in increasing the number of parts which is a cause for disturbing the downsizing of the device in the axial direction.

Thus, a need exists to provide an electromagnetic valve which can be produced at a lower cost, in order to overcome the aforementioned drawbacks.

SUMMARY OF THE INVENTION

The present invention has been developed to satisfy the need noted above and the present invention provides an electromagnetic valve comprising:

a coil-mounted yoke;
a sleeve fixed to the yoke and having ports;
a plunger slidably arranged in the yoke; and
a piston slidably arranged in the sleeve and opening and closing the ports, respectively,
the piston and the plunger being integrated with each other in such manner that an outer surface of the plunger and an outer surface of the piston are made coplanar in an axial direction,
wherein the plunger is brought into sliding movement relative to the yoke resulting from an electromagnetic flux acting on the plunger when the coil is excited, which causes the piston to slide relative to the sleeve, thereby making the piston open and close the respective ports.

In accordance with the first aspect, the piston and the plunger are integrated with each other in such a manner that the outer surface of the plunger and the outer surface of the piston are made coplanar in the axial direction, which makes it possible to furnish the outer surfaces of the respective plunger and piston concurrently by machining, thereby establishing a coaxial arrangement between the piston and the plunger with ease. Thus, the relative position relation between the piston and the plunger is made precise easily, thereby making it possible to lower the production cost. In addition, the plunger or the piston can only be supported on the sleeve or the yoke in sliding mode, which makes it possible to reduce the number of journaling bosses when compared to the conventional or prior art electromagnetic valve. Therefore, attaining lowering production cost and downsizing device in the axial direction by reducing the number of parts are made possible.

Preferably, the yoke is desired to be in the form of an integrated structure of a front yoke portion, a rear yoke portion, and a non-magnetic portion interposed between the front and rear yoke portions, the yoke being formed therein with an inner surface which has two portions, one being fixed with the sleeve, the other being used for a path to the plunger through which the electromagnetic passes.

Preferably, it is recommended that the piston is formed with an axial portion which passes through the plunger, the plunger being fixedly mounted on an outer surface of the axial portion.

BRIEF DESCRIPTION OF THE DRAWINGS

The above and other objects, features and advantages of the present invention will be more apparent and more readily appreciated from the following detailed description of preferred exemplary embodiments of the present invention, taken in conjunction with the accompanying drawings, in which.

DETAILED DESCRIPTION OF THE PRESENT INVENTION

Hereinafter, preferred embodiments of an electromagnetic valve 1 in accordance with the present invention will be described, in great detail, with reference to the attached drawings.

Figure 1:
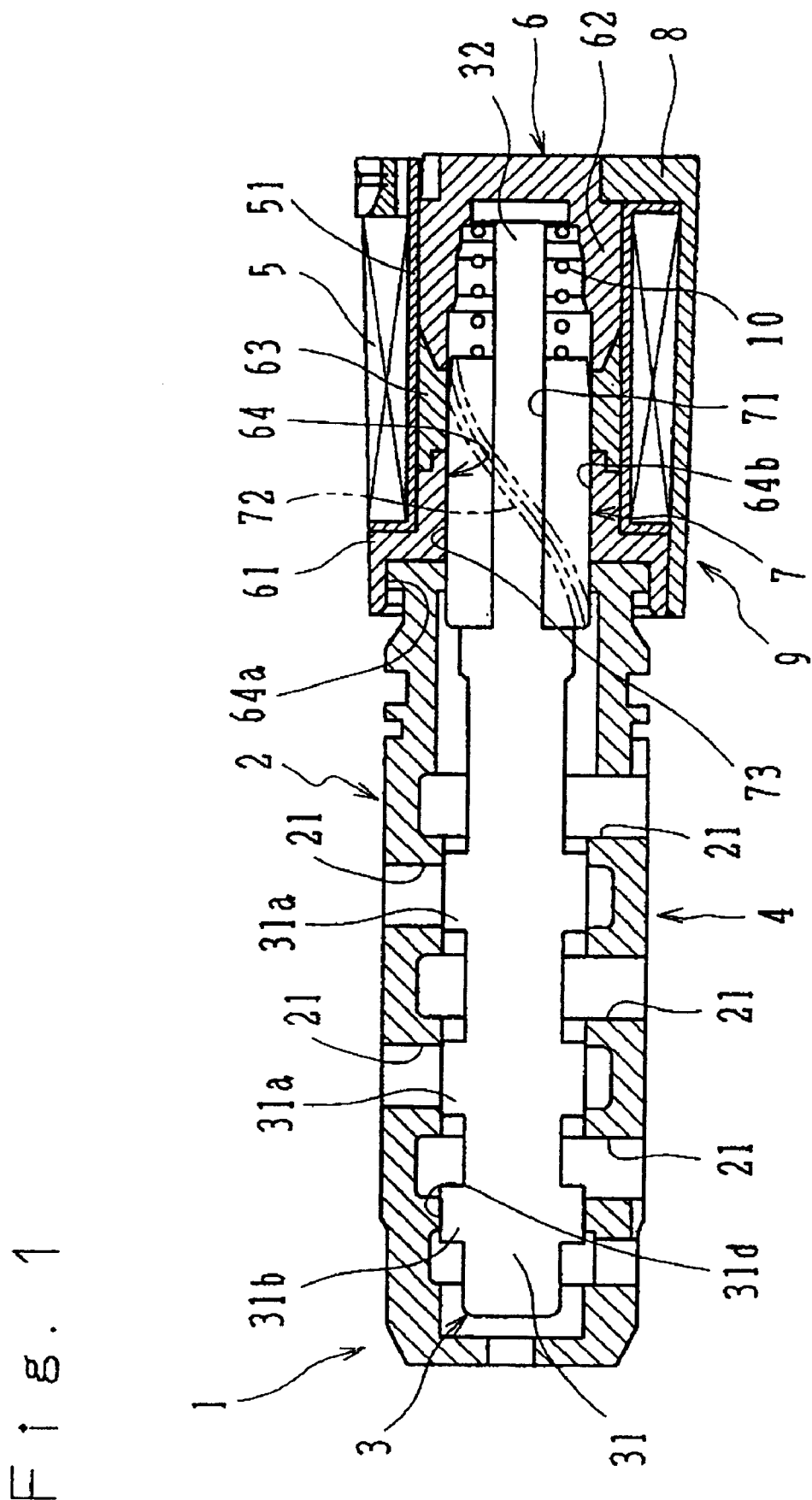
FIG. 1 illustrates a longitudinal cross-sectional view of a preferred embodiment of an electromagnetic valve in accordance with the present invention.

As shown in FIG. 1, the electromagnetic valve 1 is composed of a hydraulic pressure control valve portion 4 and an electromagnetic portion 9. The hydraulic pressure control valve portion 4 includes, as its main elements, a non-magnetic material sleeve 2 and a non-magnetic piston 3. The electromagnetic portion 9 includes, as its main elements, a yoke 6 on which a coil 5 is wound or provided and which is formed of a magnetic material and a plunger 7 which is formed of a magnetic material. The electromagnetic portion 9 is accommodated in a casing 8.

The sleeve 2 formed into a cylinder whose opposite ends are opened and its circumferential wall is provided therein with a plurality of ports 21. The piston 3 is in the form of a column shaped member and has a main body 31 with a plurality of ring-shaped lands 31a and an axial portion 32 formed integrally therewith and extending from one end of the main body 31. The piston 3 is supported by the sleeve in slidable mode in such a manner that the main body 31 is positioned within the sleeve 2 and the axial portion 32 extends outwardly in the axial direction through an opening at one end (right end in FIG. 1) of the sleeve 2. Such an arrangement causes the land 31 of the main body 31 to open and close the ports 21 and 21, respectively, in response to the sliding movements of the main body 31 in axially opposite directions.

The coil 5 is wound on an outer surface of the bobbin 51 which is shaped into a cylindrical structure and the yoke 6 is fitted or inserted into the bobbin 5. The yoke 6 is in an integrated structure which includes a front yoke portion 61 which is formed of a magnetic material, a rear yoke portion 62 which is formed of a magnetic material, and a non-magnetic portion 63 interposed or sandwiched between the front yoke portion 61 and the rear yoke portion 62. The yoke 6, formed into a cylindrical shape as a whole, is bored in order to have an inner surface 64 which includes a portion 64a at which the sleeve 2 is fixed and a portion 64b through which a magnetic flux passes. Forming the inner surface 64 makes a co-axial alignment between the portions 64a and 64b in a precise mode, which makes it possible to connect the yoke 6, at the portion 64a, to the sleeve 2 in very much precise co-axial alignment manner.

The axial portion 32 of the piston 3 extends into the yoke 6. The plunger 7, which is positioned or arranged in the portion 64b of the yoke 6, has an axially extending through bore 71. The axial portion 32 of the piston 3 is press-fitted in the bore 71 of the plunger 7. Thus, the plunger 7 is fixedly mounted on an outer surface portion of the axial portion 32 of the piston 3, thereby establishing an integrated structure of the plunger 7 and the piston 3. Outer surfaces 73 and 31d of the respective plunger 7 and piston 3 are finished concurrently in higher precision by machining and are arranged on a common plane in the axial direction, thereby establishing a precise co-axial arrangement between the plunger 7 and the piston 3. A spring 10 is interposed between a rear portion 62 of the yoke 6 and the plunger 7, which urges continually both the plunger 7 and the piston 3 in the left direction in FIG. 1.

In the above-described structure, the other end (the left end in FIG. 1) of the piston 3 is formed with a ring-shaped journaling boss 31b similar to the land 31a. The plunger and the piston 3 which are mutually integrated with each other are supported on the sleeve 2 in slidable manner at an outer surface of the boss portion 31b of the piston 3, the outer surface 31d of the piston 3, and the outer surface 73 of the plunger 7. On the outer surface 73 of the plunger 7, there is formed an oil groove 72 which allows a fluid communication between the yoke 6 and an inner space of the sleeve 2.

In operation, if the coil 5 is excited or energized when the electromagnetic valve 1 is in the illustrated state in FIG. 1, a magnetic flux is generated which extends through the yoke 6 and the plunger 7, which causes the piston 3 and the plunger 7 to slide in the rightward direction in FIG. 1 against the urging force of the spring 2, thus resulting in ports 21 and 21 being opened and closed by the lands 31a and 31a, respectively. At this stage, adjusting an amount of current to be supplied to the coil 5 results in a change of the magnetic flux acting on the plunger 7, thereby sliding the piston 3 such that its stroke depends on load-vs-deformation characteristics of the spring 10. Thus, controlling the position of the piston 3 relative to that of the sleeve 2 in linear mode makes it possible to control or adjust the hydraulic pressure characteristics of the electromagnetic valve 1 with much greater precision.

Figure 2:
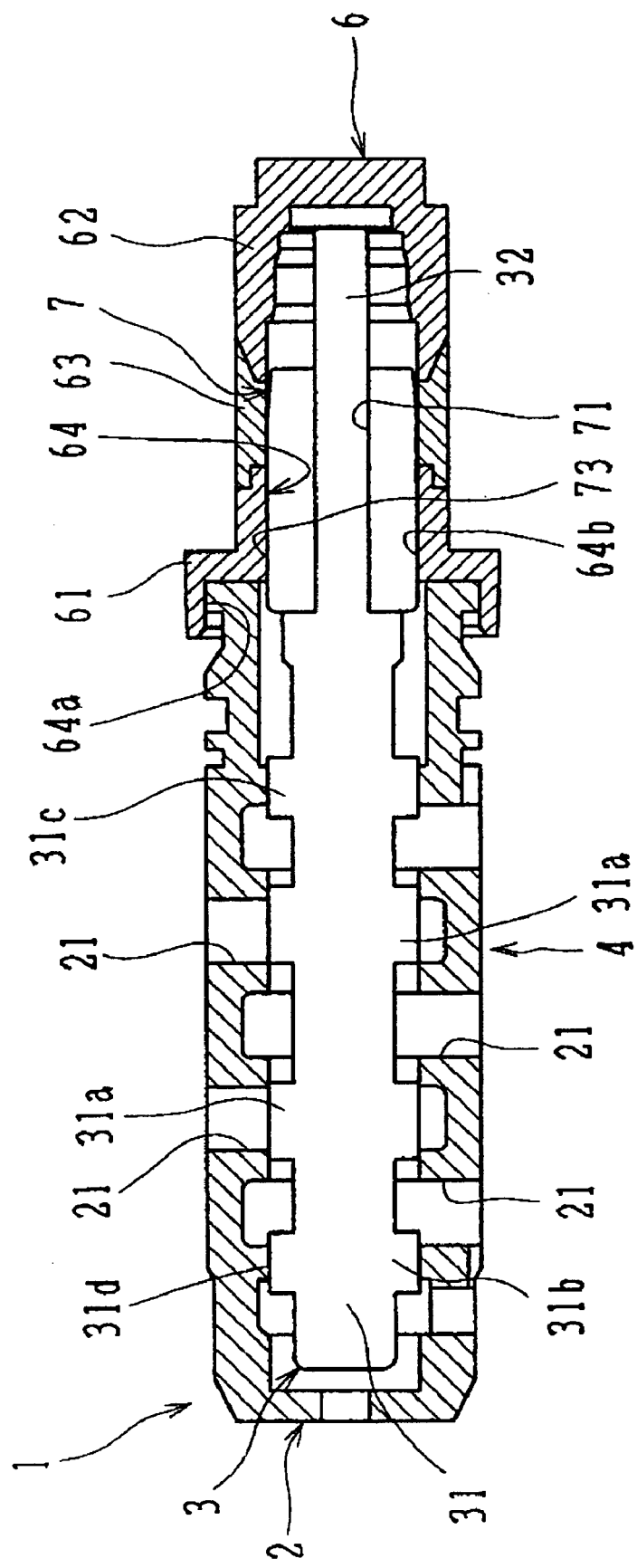
FIG. 2 illustrates a longitudinal cross-sectional view of a first alternative structure of the electromagnetic valve which is illustrated in FIG. 1.

Instead of the structure illustrated in FIG. 1, a modification of the electromagnetic valve 1 can be established, as shown in FIG. 2, by forming a ring-shaped journaling boss portion 31c similar to the boss portion 31b in order to establish a sliding support of the integration of the plunger 7 and the piston 3 at an outer surface 3d (i.e., outer surfaces of the respective boss portions 31b and 31c) of the piston 3. Thus, a fluid communication can be established between the sleeve 2 and the inner space of the yoke 6 by way of a clearance between the outer surface of the plunger 7 and the yoke 6. Such a structure is capable of eliminating the oil groove 72, thereby lowering the production cost of the electromagnetic valve 1.

Figure 3:
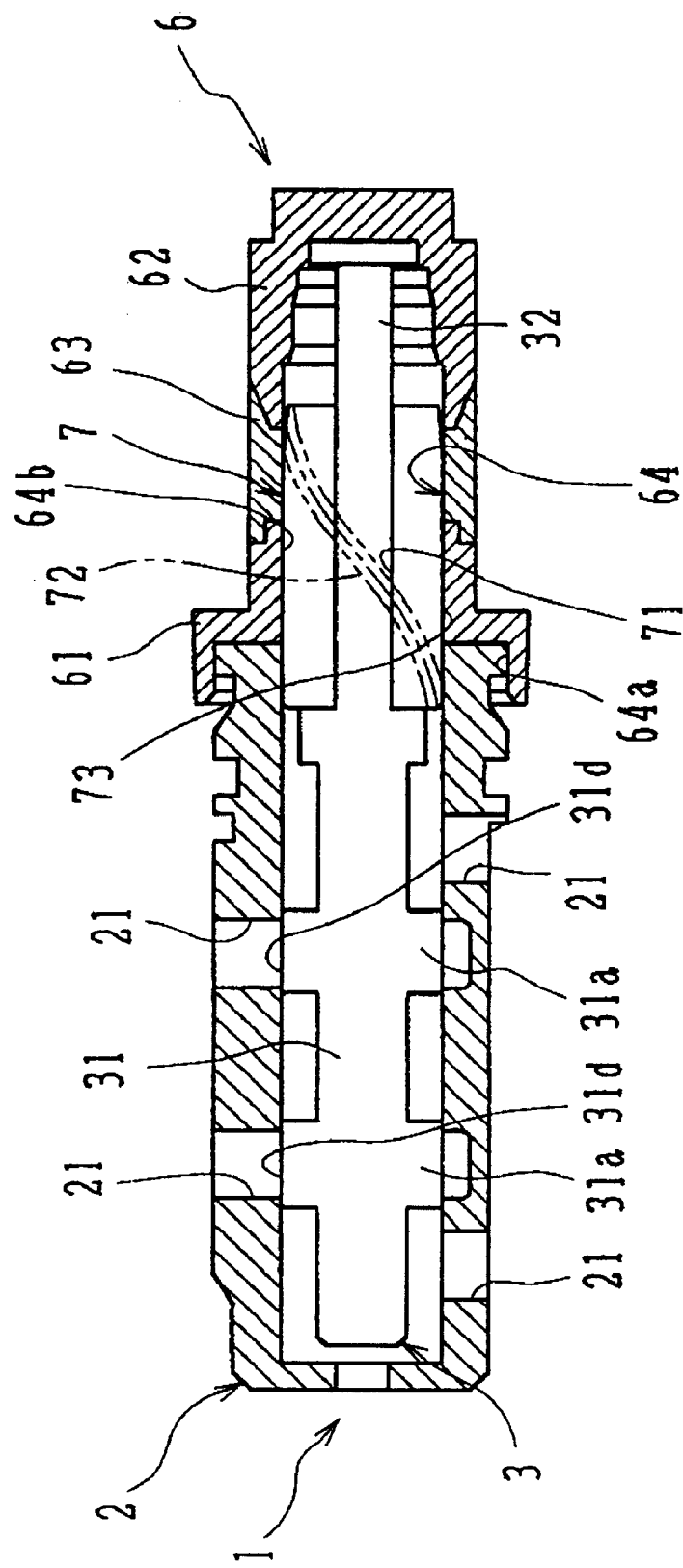
FIG. 3 illustrates a longitudinal cross-sectional view of a second alternative structure of the electromagnetic valve which is illustrated in FIG. 1.

As shown in FIG. 3, a second alternative can be made in such a manner that the left-sided land 31a is used as a journaling boss in order to establish a sliding support of the integration of the plunger 7 and the piston 3 at an outer surface 31a of the piston 3 (i.e., outer surfaces 13 of the plunger 7). Thus, the journaling boss 31b can be delimitated, thereby lowering the production cost of the electromagnetic valve 1 and downsizing the electromagnetic valve 1 in the axial direction.

Figure 4:
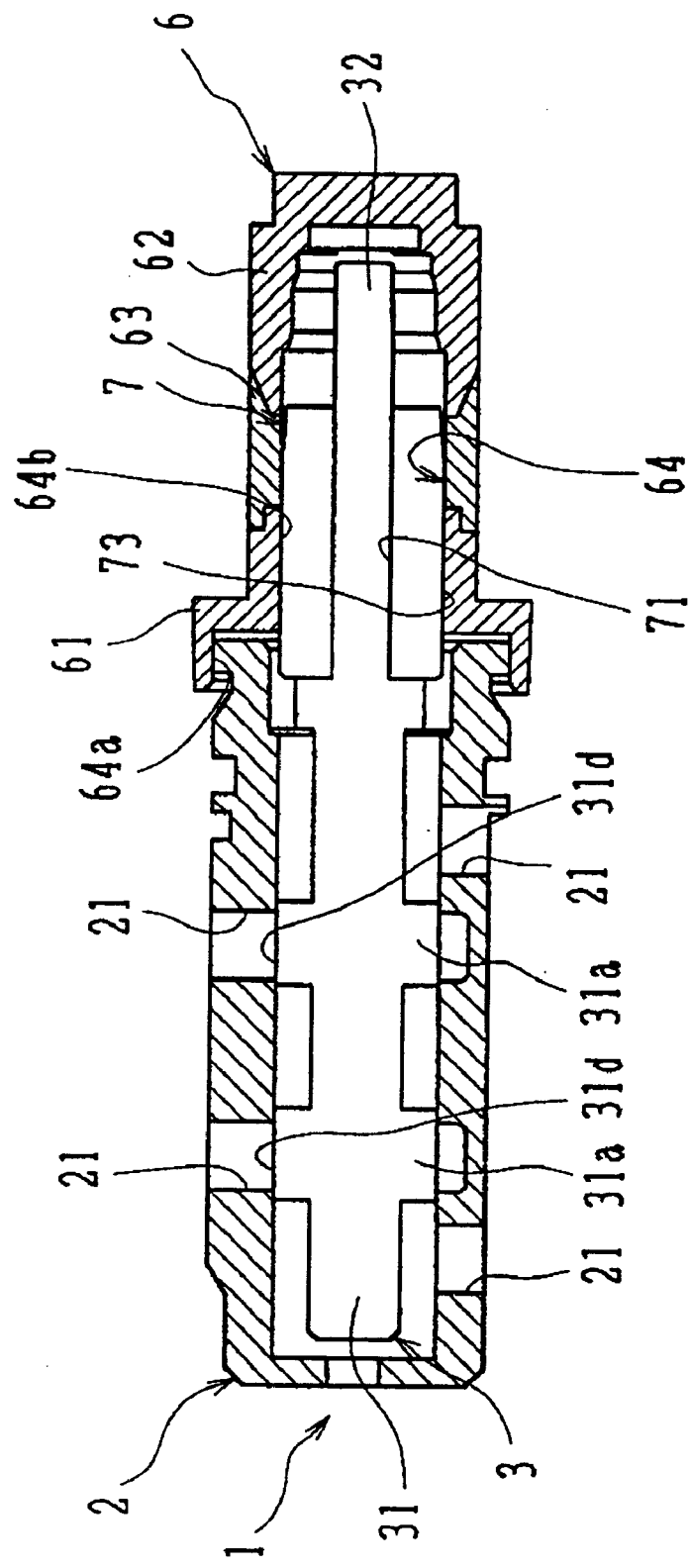
FIG. 4 illustrates a longitudinal cross-sectional view of a third alternative structure of the electromagnet valve which is illustrated in FIG. 1.

As shown in FIG. 4, a third alternative can be made in such a manner that the left-sided and right-sided lands 31 and 31a are used as respective journaling bosses in order to establish a sliding support of the integration of the plunger 7 and the piston 3 on the sleeve 2 at an outer surface of each land 31a of the piston 3 (i.e., only the outer surface 31d of the piston 31). Thus, the journaling boss 31b can be delimitated in addition to eliminating the oil groove 72, thereby lowering the production cost of the electromagnetic valve 1 and downsizing the electromagnetic valve 1 in the axial direction.

The invention has thus been shown with a description of the references to specific embodiments; however, it should be understood that the invention is in no way limited to the details of the illustrates structures but that changes and modifications may be made without departing from the scope of the appended claims.

What is claimed is:

1. An electromagnetic valve comprising:

a coil-wound yoke;

a sleeve fixed to the yoke and having ports;

a plunger arranged in the yoke in sliding mode; and a piston arranged in the sleeve in sliding mode and opening and closing the ports, respectively, the piston and the plunger being integrated with each other in such manner that an outer surface of the plunger and an outer surface of the piston are made coplanar in an axial direction, wherein the plunger is brought into sliding movement relative to the yoke resulting from an electromagnetic flux acting on the plunger when the coil is excited, which causes the piston to slide relative to the sleeve, thereby making the piston open and close the respective ports.

2. An electromagnetic valve as set forth in claim 1, wherein the yoke is in the form of an integrated structure of a front yoke portion, a rear yoke portion, and a non-magnetic portion interposed between the front and rear yoke portions, the yoke being formed therein with an inner surface which has two portions, one being fixed with the sleeve, the other being used for a path to the plunger through which the electromagnetic passes.

3. An electromagnetic valve as set forth in claim 1, wherein the piston is formed with an axial portion which passes through the plunger, the plunger being fixedly mounted on an outer surface of the axial portion.

* * * * *